(12) United States Patent
Pan

(10) Patent No.: US 6,859,978 B2
(45) Date of Patent: Mar. 1, 2005

(54) FLIP PHONE HAVING A HINGE MECHANISM WITH AN AUTO-LOCK FUNCTION

(75) Inventor: Long-Jyh Pan, Shijr (TW)

(73) Assignee: BenQ Corporation, Taoyuan (TW)

( * ) Notice: Subject to any disclaimer, the term of this patent is extended or adjusted under 35 U.S.C. 154(b) by 93 days.

(21) Appl. No.: 10/374,080

(22) Filed: Feb. 27, 2003

(65) Prior Publication Data

US 2003/0172495 A1 Sep. 18, 2003

(30) Foreign Application Priority Data

Mar. 14, 2002 (TW) .......................... 91104828 A

(51) Int. Cl.[7] .................................................. E05F 1/08
(52) U.S. Cl. .............................. 16/292; 16/308; 16/277
(58) Field of Search ........................ 16/308, 232, 255, 16/257, 256, 277, 285, 295, 297, 292

(56) References Cited

U.S. PATENT DOCUMENTS

| | | | | |
|---|---|---|---|---|
| 864,747 A | * | 8/1907 | Wilson | 16/285 |
| 1,076,568 A | * | 10/1913 | Furuya | 16/297 |
| 4,326,321 A | * | 4/1982 | Colognori | 24/265 B |
| 4,591,836 A | * | 5/1986 | Feigenblatt et al. | 340/574 |
| 5,274,882 A | * | 1/1994 | Persson | 16/303 |
| 5,640,690 A | * | 6/1997 | Kudrna | 455/575.3 |
| 5,678,206 A | * | 10/1997 | Ishii | 455/575.8 |
| 5,697,124 A | * | 12/1997 | Jung | 16/341 |
| 5,881,150 A | * | 3/1999 | Persson | 379/433.13 |
| 5,909,653 A | * | 6/1999 | Imura et al. | 455/575.7 |
| 5,971,472 A | * | 10/1999 | Schreiter et al. | 296/217 |
| 6,023,816 A | * | 2/2000 | Okada et al. | 24/71 J |
| 6,256,481 B1 | | 7/2001 | Jeong et al. | 455/90 |

* cited by examiner

Primary Examiner—John B. Walsh
(74) Attorney, Agent, or Firm—Rabin & Berdo, P.C.

(57) ABSTRACT

A flip phone having a hinge mechanism with an auto-lock function includes a main body, a flipper, a sleeve shaft, a torsion spring, a first bush and a second bush, a torsion spring, and a first chute and a second chute. The torsion spring having a first spring end and a second spring end is disposed between the first bush and the second bush. The first spring end connected to the first bush synchronously rotates with the first bush and the second spring end connected to the second bush synchronously rotates with the second bush. The first bush is rotatably coupled to the first chute, and the second bush is rotatably coupled to the torsion spring chamber so that the flipper is rotatable around the hinge mechanism longitudinal axis to be in an opened position or a closed position. When the rotating object remains in the closed position, the torsion spring stores energy for unfolding the rotating object.

16 Claims, 8 Drawing Sheets

FLIP PHONE HAVING A HINGE MECHANISM WITH AN AUTO-LOCK FUNCTION

This application claims the benefit of Taiwan application Serial No. 91104828, filed Mar. 14, 2002.

BACKGROUND OF THE INVENTION

1. Field of the Invention

The invention relates in general to a hinge mechanism, and more particularly to an auto-lock hinge mechanism.

2. Description of the Related Art

There are various compact electronic devices having flippers, which can be opened to a specific size to make the device easy to operate when it is in use, and can be closed for protection when the device is not in use. For example, the flipper protects the keypad from inadvertent entries and prevents the screen from being damaged or exposed to dust. The cellular flip phone has become in wide demand not only because it has the aforementioned advantages, but also because its flipper is adapted to accommodate a variety of distinguished appearances for aesthetic purposes.

Please refer to FIG. 1A, which shows a flip phone. The flip phone 100 mainly includes a main body 110 and a flipper 120. The flipper 120 is coupled with the main body 110 by the hinge mechanism 130 and can pivotally rotate relative to the main body 110 along the direction of arrow sign in FIG. 1 to be in an opened position or a closed position. Combining a cam with the hinge having a spring is a common design for the hinge mechanism 130, so that the flipper 120 can steadily stay in the opened position or the closed position due to the elasticity of the spring. In practice, the cam can be so easily worn out that the force imposed on the spring for compression is insufficient to produce enough elasticity of the spring. Additionally, the user who is about to open or close the flipper 120 would have to impose a force to turn the flipper 120 to move across the dead point until the flipper 120 is fixedly positioned by means of the elasticity of the spring. Those two conditions of the traditional cam-spring type hinge mechanism might cause great inconvenience for users who want to operate the phone easily with one hand.

SUMMARY OF THE INVENTION

It is therefore an object of the invention to provide a flip phone having a hinge mechanism with an auto-lock function by using a special chute design. The flipper will not be flipped open as a result of an inadvertent slight vibration but is convenient to use for a one-handed operation.

The invention achieves the above-identified objects by providing a flip phone having a hinge mechanism with an auto-lock function. The flip phone includes a main body, a flipper, a sleeve shaft, a torsion spring, a first bush and a second bush, a torsion spring, and a first chute and a second chute. The first bush is rotatably coupled to the first chute, and the second bush is rotatably coupled to the torsion spring chamber so that the flipper is rotatable around the hinge mechanism longitudinal axis to be in an opened position or a closed position. When the rotating object remains in the closed position, the torsion spring stores energy for unfolding the rotating object. The sleeve shaft with the torsion spring chamber is located on the flipper and has a first opening and a second opening. The torsion spring chamber extends along a hinge mechanism longitudinal axis. The first bush is disposed within the torsion spring chamber for sliding along the hinge mechanism longitudinal axis. The first bush connecting end of the first bush passes through the first opening and protrudes outside the sleeve shaft. The second bush is rotatably disposed within the torsion spring chamber. The second bush connecting end of the second bush passes through the second opening and protrudes outside the sleeve shaft. The torsion spring having a first spring end and a second spring end is disposed between the first bush and the second bush. The first spring end connected to the first bush synchronously rotates with the first bush and the second spring end connected to the second bush synchronously rotates with the second bush. The first chute and the second chute are disposed on the main body. The first chute receives the first bush connecting end and the second chute receives the second bush connecting end.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
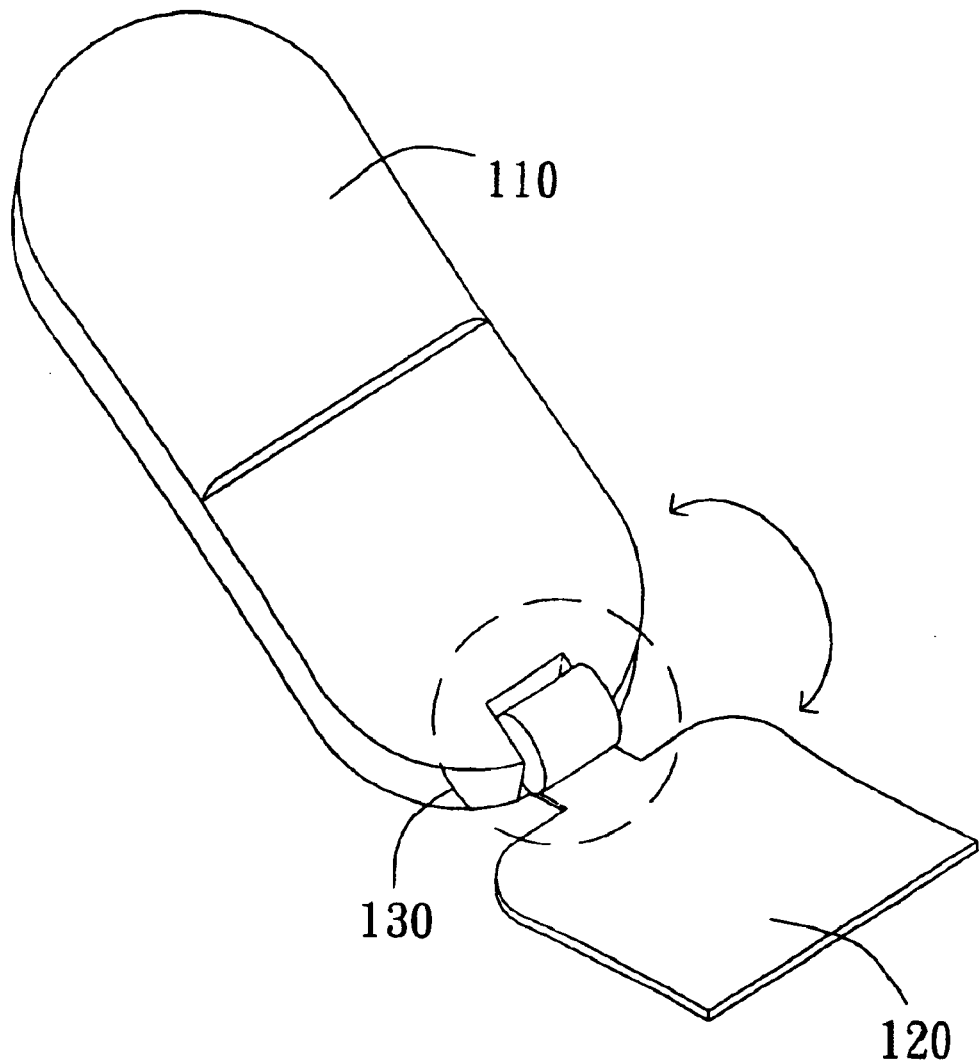
FIG. 1 shows a flip phone.
Figure 2:
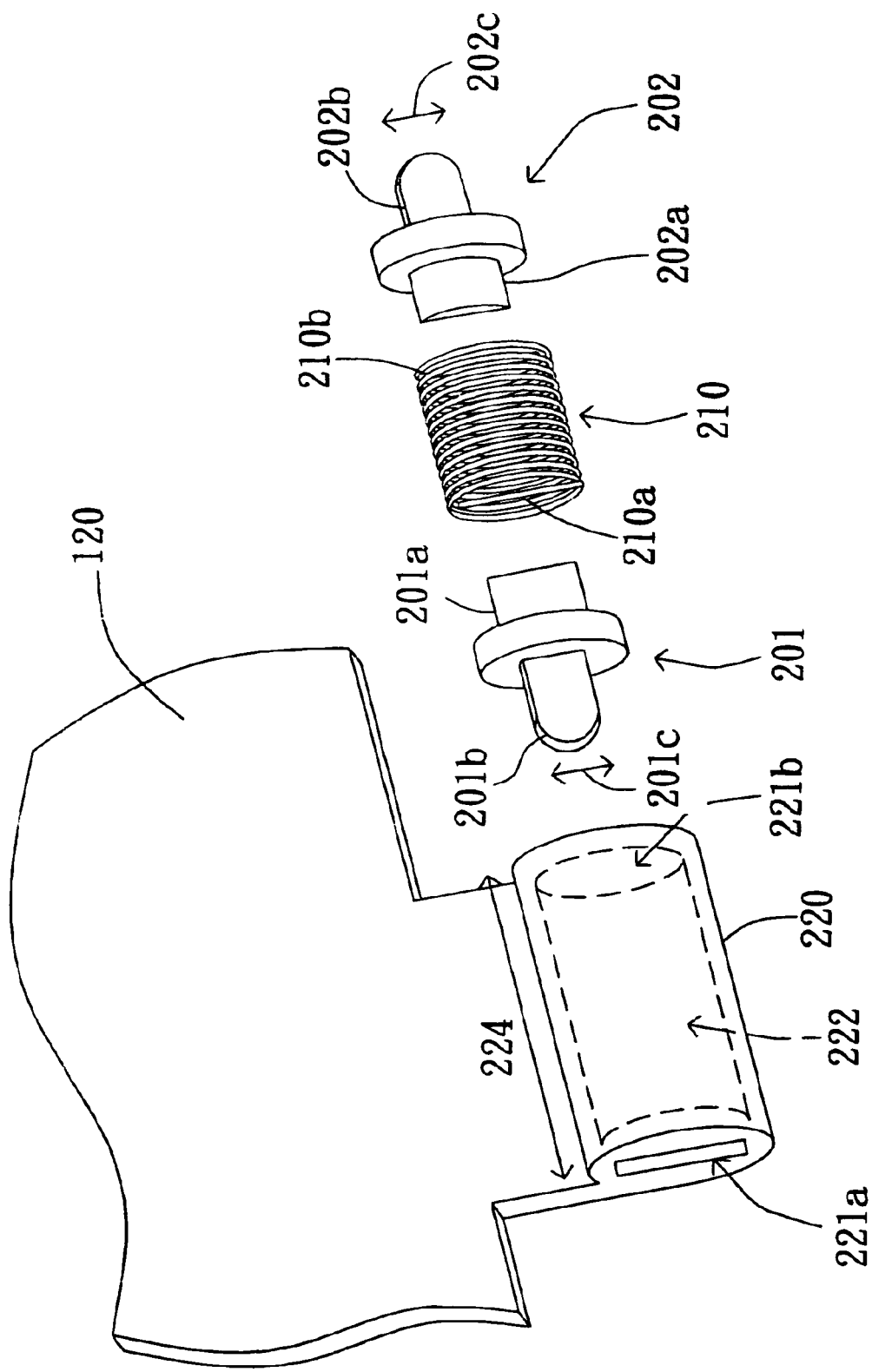
FIG. 2 is an exploded view of a hinge mechanism according to a preferred embodiment of the invention.
Figure 3:
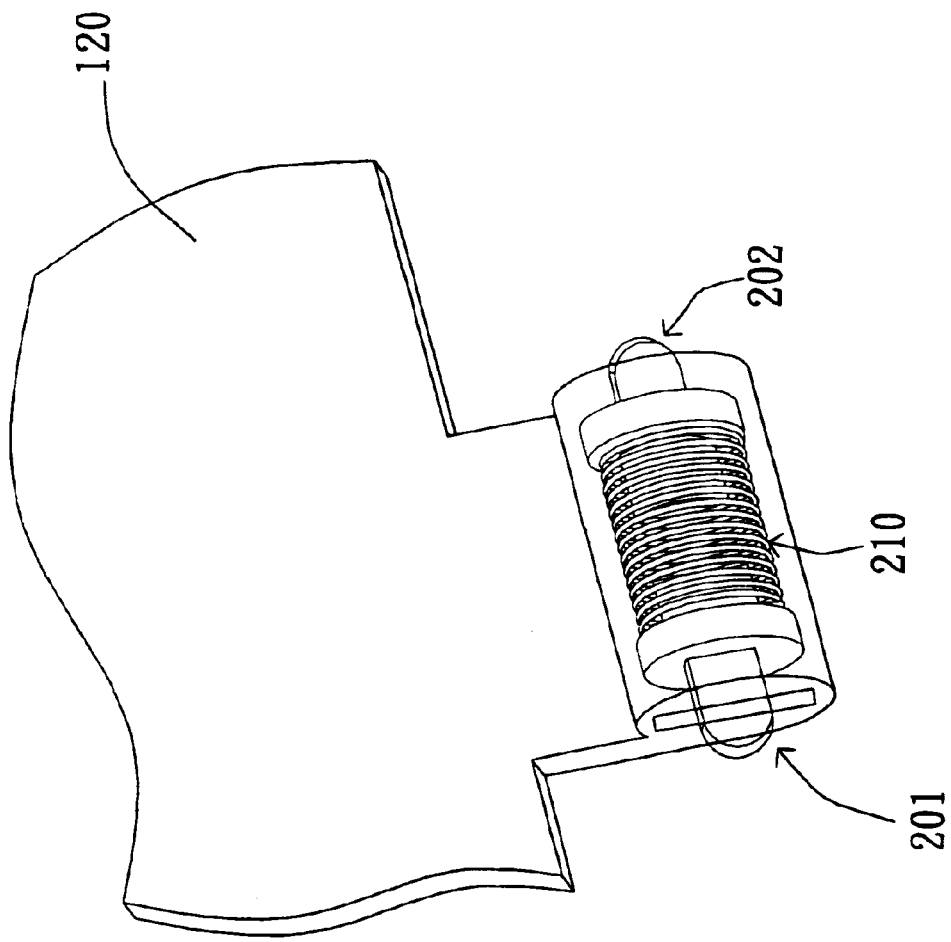
FIG. 3 is a perspective view of the hinge mechanism according to the preferred embodiment of the invention.

Referring to FIG. 2, it shows an exploded view of a hinge mechanism according to a preferred embodiment of the invention, wherein the hinge mechanism 130 is used for coupling the main body and a rotating object. The rotating object can pivotally rotate relative to the main body to be fixed in an opened position or a closed position. As shown in FIG. 2, the hinge mechanism 130 includes a sleeve shaft 220. The inside of the sleeve shaft 220 forms a torsion spring chamber 222, and the torsion spring chamber 222 extends along a hinge mechanism longitudinal axis 224. The torsion spring chamber 222 is able to receive the bush 201, the torsion spring 210, and the bush 202 sequentially so that the bush connecting end 201b of the bush 201 and the bush connecting end 202b of the bush 202 protrude outside the sleeve shaft at opposite ends, as shown in FIG. 3.

The torsion spring 210 is disposed between the bushes 201 and 202 for being compressed inwardly for the easy assembly of the torsion spring 210 and the bushes 201 and 202 into the torsion spring chamber 222. The first spring end of the torsion spring 210 forms a non-circular hole 210a and the second spring end of the torsion spring 210 forms a non-circular hole 210b. The bush 201 has a non-circular bulge 201a and the bush 202 has a second non-circular bulge 202a. After assembly, the bushes 201 and 202 are connected with the two ends of the torsion spring 210 tightly by fixing the non-circular bulges 201a and 202a into the non-circular holes 210a and 210b respectively. For example, the non-circular holes are D-shaped holes and the non-circular bulges are D-shaped bulges. The D-shaped holes at the two ends of the torsion spring 210 receive the D-shaped bulges disposed at the bushes 201 and 202 respectively for fixing so that the first spring end of the torsion spring 210 connected to the first bush 201 synchronously rotates with the first bush 201 and the second spring end of the torsion spring 210 connected to the second bush 202 synchronously rotates with the second bush 202. When the assembly of the hinge mechanism is finished, the bush 201 is disposed within the torsion spring chamber 222 for sliding along the hinge mechanism longitudinal axis 224 while the bush 202 is rotatably disposed within the torsion spring chamber 222. As shown in FIG. 2, the first side of the sleeve shaft 220 has a slot 221a for fixing the bush connecting end 201b so that the bush 201 moves along the hinge mechanism longitudinal axis 224. The second side of the sleeve shaft 220 has a circular opening 221b so that the bush connection end 202b rotates within the circular opening 221b and therefore the bush 202 rotates relative to the sleeve shaft 220. Also, the bush connecting end 201b passes through the slot 221a and protrudes outside the sleeve shaft 220 while the bush connecting end 202b passes through the circular opening 221b and protrudes outside the sleeve shaft 220, as shown in FIG. 3.

Figure 4A:
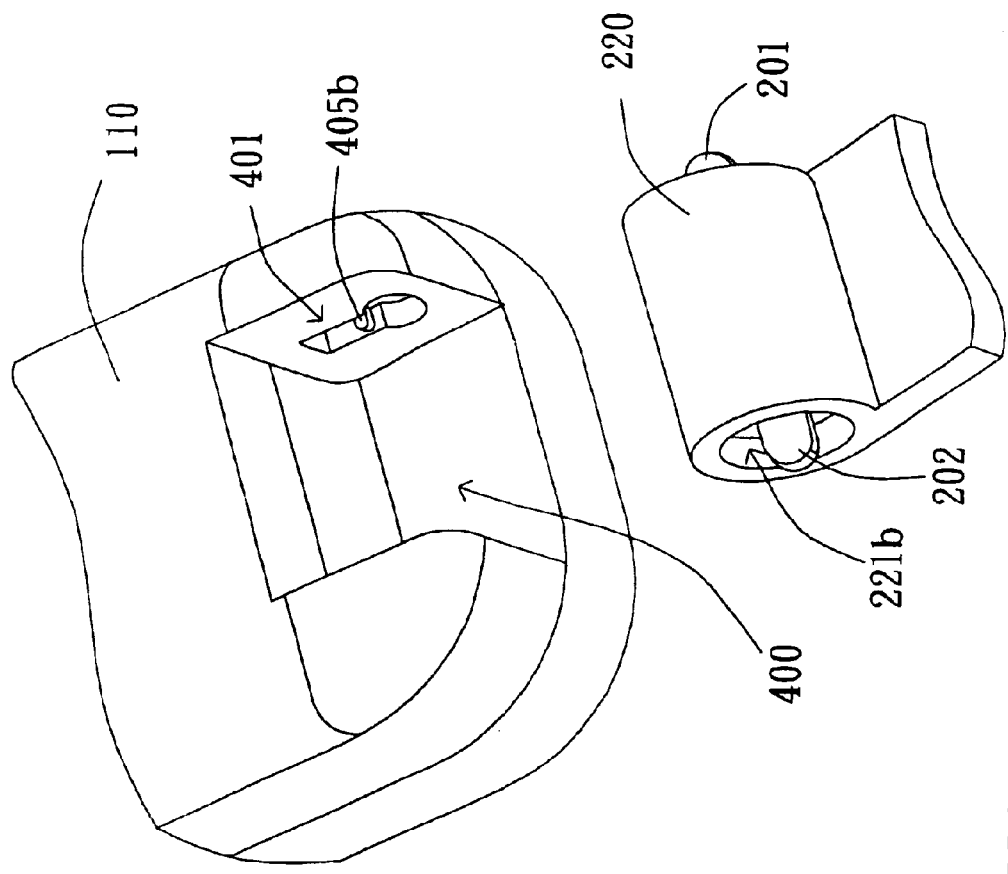
FIG. 4A shows a sleeve and an insert bay according to the preferred embodiment of the invention.
Figure 4C:
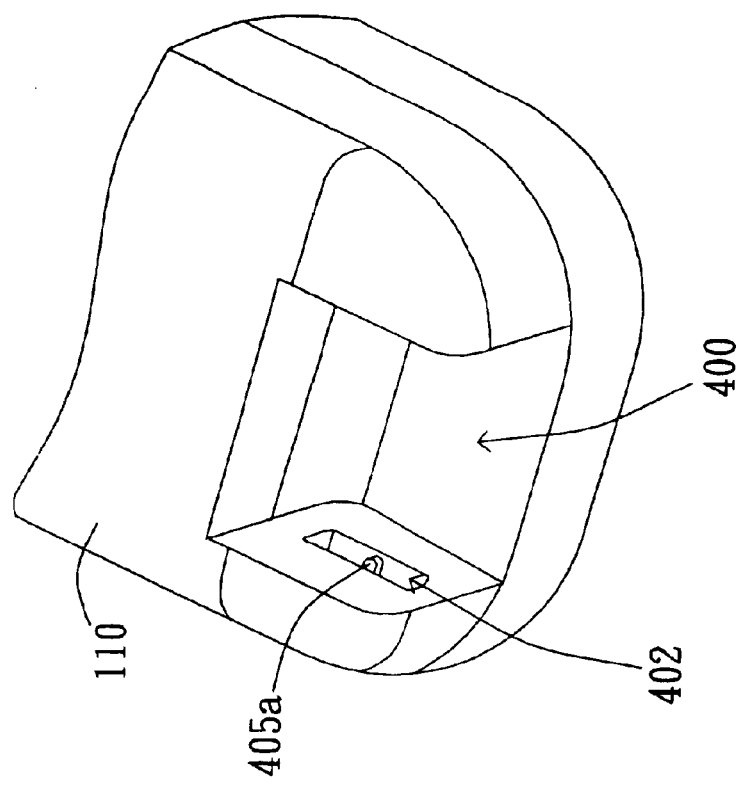
FIGS. 4B and 4C show chutes according to the preferred embodiment of the invention.
Figure 4B:
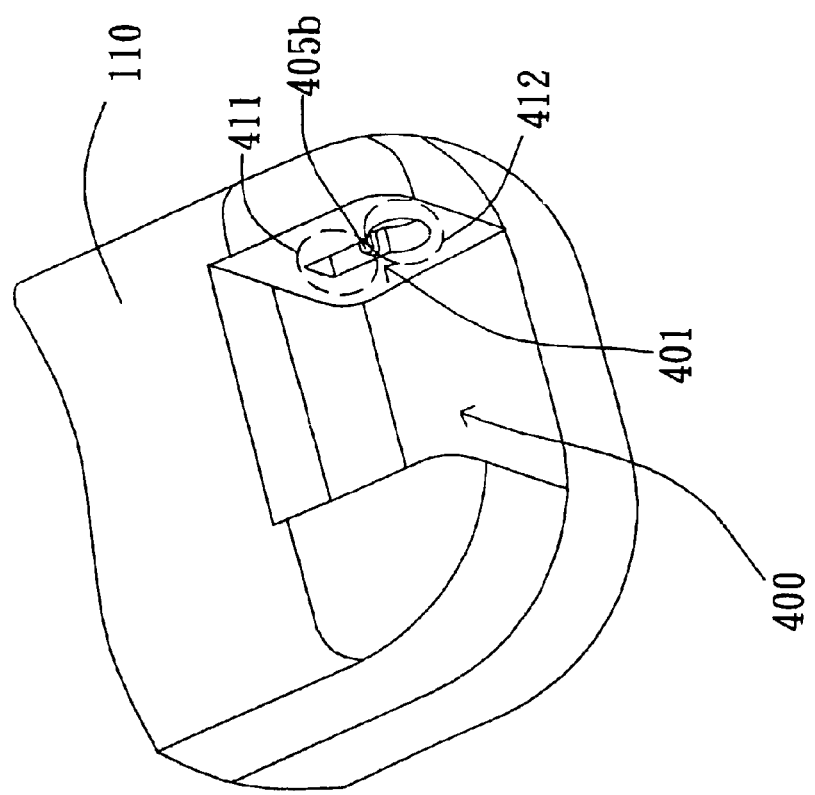
Figure 4D:
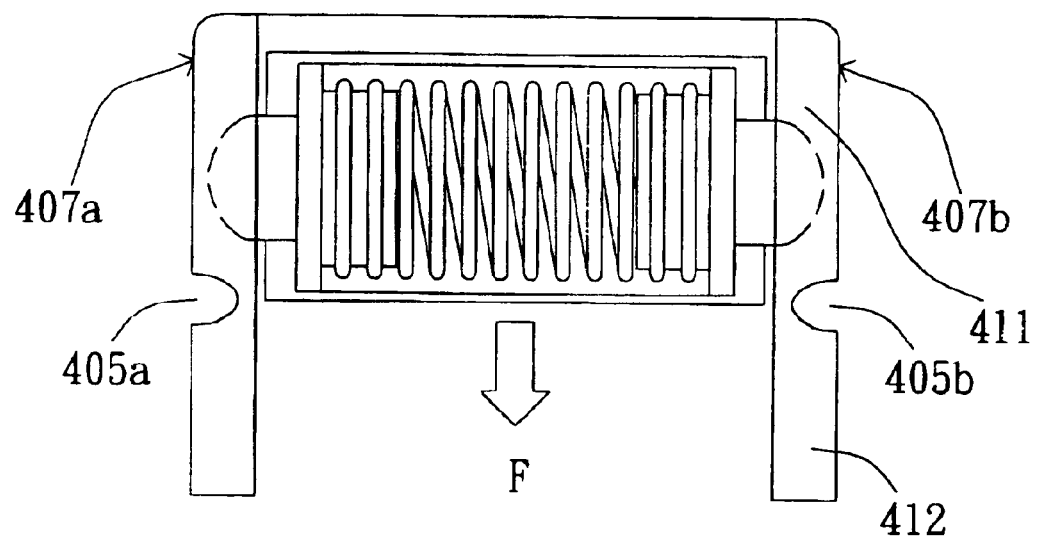
FIG. 4D is a perspective view of the hinge mechanism installed in the insert bay according to the preferred embodiment of the invention.

Referring to FIG. 4A, a sleeve and an insert bay are shown according to the preferred embodiment of the invention. The insert bay 400 is located in the main body 110 of the flip phone 100 and is coupled with the sleeve shaft 220. Next, FIGS. 4B and 4C show the chutes according to the preferred embodiment of the invention. The insert bay 400 further includes chutes 401 and 402 for being coupled to the bushes 201 and 202 respectively. The chute 401 has a rib 405b, a front section 411, and a rear section 412 while the chute 402 has a rib 405a. The rib 405b is disposed on the sidewall 407b at the border between the front section 411 and the rear section 412. As shown in FIG. 4D, the hinge mechanism 130 is installed in the insert bay 400. The bush connecting end 201b of the bush 201 moves between the front section 411 and the rear section 412. Thus, the user would impose a force F to overcome the elasticity of the spring, which results from the compression of the torsion spring 210 by the two ribs 405b and 405a.

Since the first bush connecting end 201b substantially extends for a first length along a first longitudinal axis 201c, the width of the front section 411 is smaller than the first length of the first bush connecting end 210b, and the width of the rear section 412 is larger than the first length of the first bush connecting end 201b. The bush 201 slides relative to the chute 401 while the bush connecting end 201b is received within the front section 411 and the bush 201 rotates relative to the chute 401 while the first bush connecting end 201b is received within the rear section 412. Additionally, the second bush connecting end 202b substantially extends for a second length along a second longitudinal axis 202c, and the width of the chute 402 is smaller than the second length of the second longitudinal axis 202c so that the bush 202 is slidable within the chute 402 while the second bush connecting end 202b is received within the chute 402.

Figure 5A:
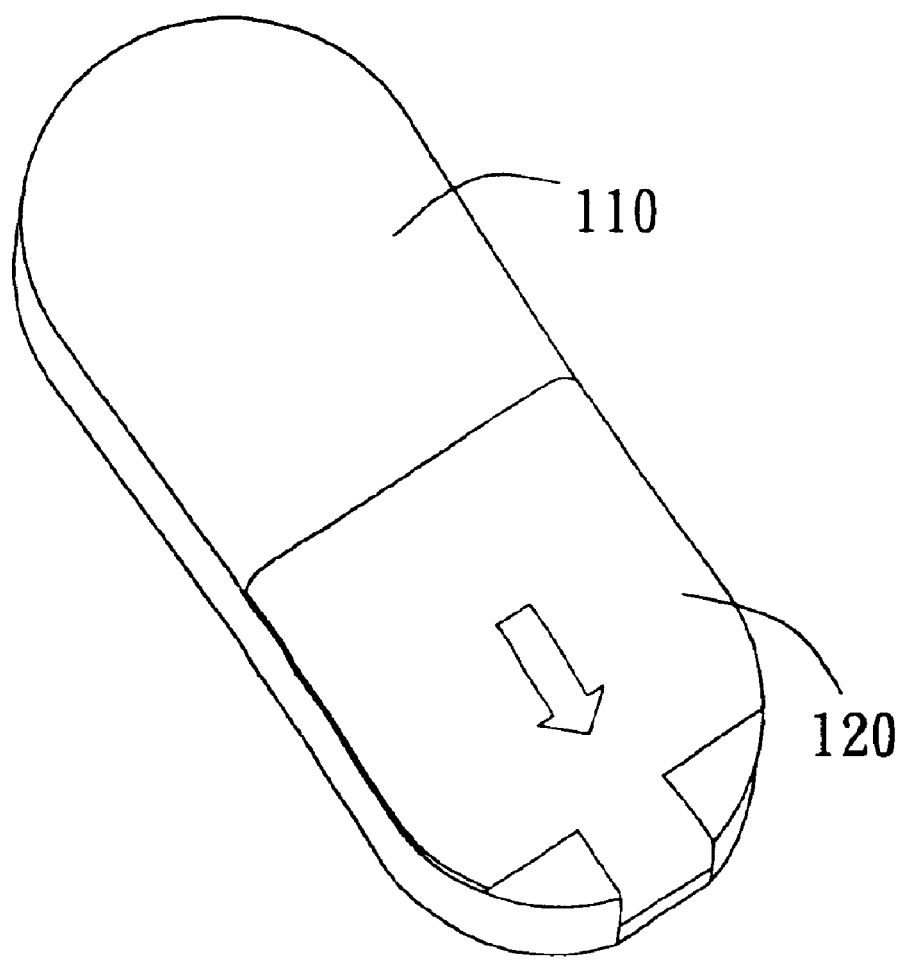
FIG. 5A shows a flip phone with a folded flipper according to the preferred embodiment of the invention.
Figure 5B:
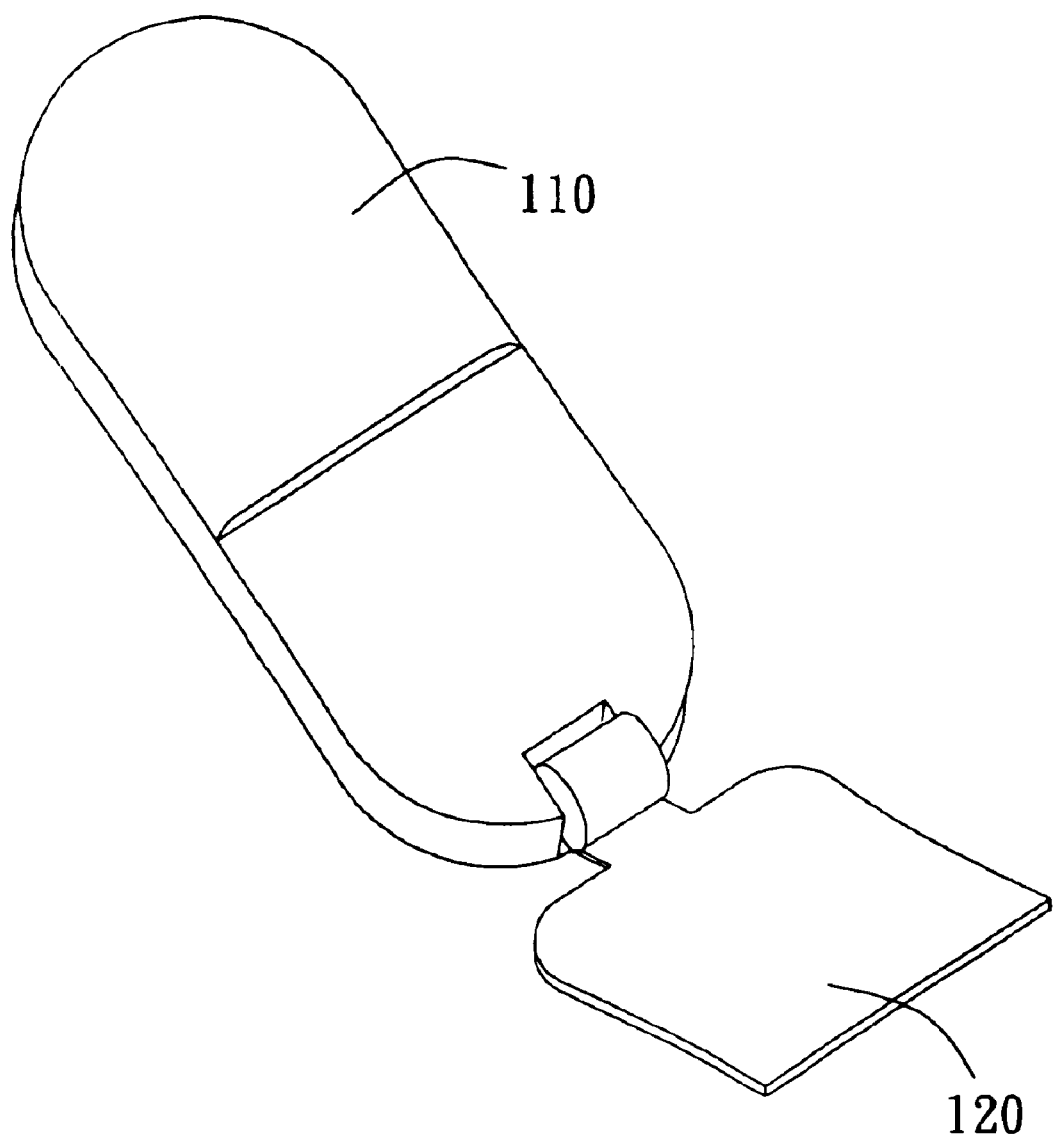
FIG. 5B shows a flip phone with an unfolded flipper according to the preferred embodiment of the invention.

Please refer to FIG. 5A, which illustrates a flip phone with a folded flipper according to the preferred embodiment of the invention. As shown in FIG. 5A, the torsion spring stores up energy for unfolding the rotating object while the rotating object remains in the closed position. The energy for unfolding the flipper 120 is stored within the torsion spring 210 when the flipper 120 remains in the closed position. The bush 201 can slide relative to the chute 401 since the first bush connecting end 201b is received within the front section 411. The bush 201 can be moved down to the rear section 412 of the chute 402 by levelly pushing the flipper 120 in the direction of the arrow sign in FIG. 5A and then the bush 201 rotates relative to the chute 402 due to the release of the energy for unfolding the flipper 120 from the torsion spring 210. Since the bush 201 carries the flipper 120 for rotation, the flipper 120 is rotatable around the hinge mechanism longitudinal axis 224 to be in an opened position, as shown in FIG. 5B. Furthermore, the flipper 120 can be folded again by giving a force in the reverse direction to rotate the second bush relative to the first bush; in the meantime, the second spring end 210a rotates relative to the first spring end 210b to produce energy for unfolding the flipper 120, and the energy for unfolding the flipper 120 can be stored up for the next release. Subsequently, the flipper 120 is levelly pushed up and the bush 201 slides back to the front section 411 of the chute 401 for locking the flipper 120. The flipper 120 is therefore fixed in the closed position by using the special design of chutes 401 and 402, and will not be flipped open as a result of an improper slight vibration.

The flip phone having a hinge mechanism with an auto-lock function according to the preferred embodiment of the invention has the following advantages:

1. The structure of the hinge mechanism is simple and convenient to use in a one-handed operation;

2. The diameter of the hinge mechanism can be minimized;

3. The hinge mechanism flips in one direction and provides an auto-lock function by using a special chute design;

4. The two bushes have the same design, thus preventing the poor positioning or misalignment of the bushes.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hinge mechanism with an auto-lock function for coupling a main body and a rotating object, the hinge mechanism comprising:

a sleeve shaft with a torsion spring chamber, located on the rotating object, wherein the torsion spring chamber extends along a hinge mechanism longitudinal axis and the sleeve shaft has a first opening and a second opening;

a first bush having a first bush connecting end, disposed within the torsion spring chamber, for sliding along the hinge mechanism longitudinal axis, wherein the first bush connecting end passes through the first opening and protrudes outside the sleeve shaft;

a second bush having a second bush connecting end, rotatably disposed within the torsion spring chamber, wherein the second bush connecting end passes through the second opening and protrudes outside the sleeve shaft;

a torsion spring having a first spring end connected to the first bush and a second spring end connected to the second bush, disposed between the first bush and the second bush, wherein the second spring end rotates relative to the first spring end to produce energy for unfolding the rotating object when the second bush rotates relative to the first bush; and a first chute and a second chute, disposed on the main body, wherein the first chute receives the first bush connecting end and the second chute receives the second bush connecting end;

wherein the rotating object rotates relative to the main body around the hinge mechanism longitudinal axis to be unfolded by releasing the energy from the torsion spring.

2. The hinge mechanism according to claim 1, wherein the first bush has a first non-circular bulge and the second bush has a second non-circular bulge, and wherein the first spring end of the torsion spring has a first non-circular hole for receiving the first non-circular bulge and the second spring end of the torsion spring has a second non-circular hole for receiving the second non-circular bulge.

3. The hinge mechanism according to claim 2, wherein the first and second non-circular holes are D-shaped holes, and the first and second non-circular bulges are D-shaped bulges.

4. The hinge mechanism according to claim 1, wherein a first side of the sleeve shaft has a slot for fixing the first bush connecting end so that the first bush moves along the hinge mechanism longitudinal axis.

5. The hinge mechanism according to claim 4, wherein a second side of the sleeve shaft has a circular opening and the second bush connection end rotates within the circular opening so that the second bush rotates relative to the sleeve shaft.

6. The hinge mechanism according to claim 1, wherein the first chute comprises a front section and a rear section, the first bush connecting end substantially extends for a first length along a first longitudinal axis, the width of the front section is smaller than the first length of the first bush connecting end, and the width of the rear section is larger than the first length of the first bush connecting end; wherein the first bush is slidable within the first chute while the first bush connecting end is received within the front section and the first bush is rotatable within the first chute while the first bush connecting end is received within the rear section.

7. The hinge mechanism according to claim 6, wherein the first chute further comprises a rib disposed on a border between the front section and the rear section, for compressing the torsion spring while the first bush connecting end moves between the front section and the rear section.

8. The hinge mechanism according to claim 6, wherein the second bush connecting end substantially extends for a second length along a second longitudinal axis, and the width of the second chute is smaller than the second length of the second bush connecting end so that the second bush is slidable within the second chute while the second bush connecting end is received within the second chute.

9. A flip phone, comprising:

a main body;

a flipper;

a sleeve shaft with a torsion spring chamber, located on the flipper, wherein the torsion spring chamber extends along a hinge mechanism longitudinal axis and the sleeve shaft has a first opening and a second opening;

a first bush having a first bush connecting end, disposed within the torsion spring chamber, for sliding along the hinge mechanism longitudinal axis, wherein the first bush connecting end passes through the first opening and protrudes outside the sleeve shaft;

a second bush having a second bush connecting end, rotatably disposed within the torsion spring chamber, wherein the second bush connecting end passes through the second opening and protrudes outside the sleeve shaft;

a torsion spring having a first spring end connected to the second bush and a second spring end connected to the first bush, disposed between the first bush and the second bush, wherein the second spring end rotates relative to the first spring end to produce energy for unfolding the flipper when the second bush rotates relative to the first bush; and a first chute and a second chute, disposed on the main body, wherein the first chute receives the first bush connecting end and the second chute receives the second bush connecting end;

wherein the flipper rotates relative to the main body around the hinge mechanism longitudinal axis to be unfolded by releasing the energy from the torsion spring.

10. The flip phone according to claim 9, wherein the first bush has a first non-circular bulge and the second bush has a second non-circular bulge, and wherein the first spring end of the torsion spring has a first non-circular hole for receiving the first non-circular bulge and the second spring end of the torsion spring has a second non-circular hole for receiving the second non-circular bulge.

11. The flip phone according to claim 10, wherein the first and second non-circular holes are D-shaped holes, and the first and second non-circular bulges are D-shaped bulges.

12. The flip phone according to claim 9, wherein a first side of the sleeve shaft has a slot for fixing the first bush connecting end so that the first bush moves along the hinge mechanism longitudinal axis.

13. The flip phone according to claim 12, wherein a second side of the sleeve shaft has a circular opening and the second bush connection end rotates within the circular opening so that the second bush rotates relative to the sleeve shaft.

14. The flip phone according to claim 9, wherein the first chute comprises a front section and a rear section, the first bush connecting end substantially extends for a first length along a first longitudinal axis, the width of the front section is smaller than the first length of the first bush connecting end, and the width of the rear section is larger than the first length of the first bush connecting end, wherein the first bush is slidable within the first chute while the first bush connecting end is received within the front section and the first bush is rotatable within the first chute while the first bush connecting end is received within the rear section.

15. The flip phone according to claim 14, wherein the first chute further comprises a rib disposed on a border between the front section and the rear section, for compressing the torsion spring while the first bush connecting end moves between the front section and the rear section.

16. The flip phone according to claim 14, wherein the second bush connecting end substantially extends for a second length along a second longitudinal axis, and the width of the second chute is smaller than the second length of the second bush connecting end so that the second bush is slidable within the second chute while the second bush connecting end is received within the second chute.

* * * * *